Patented May 11, 1926.

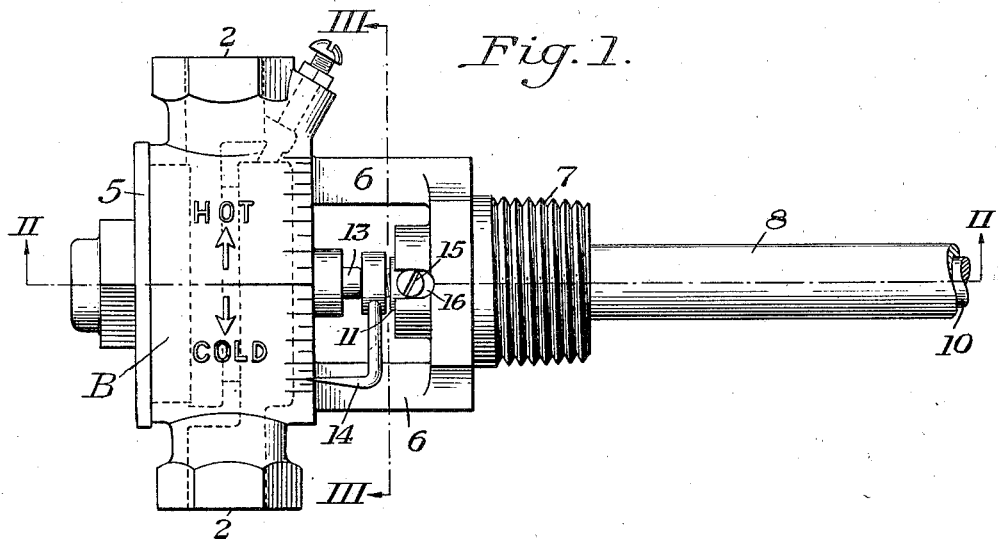
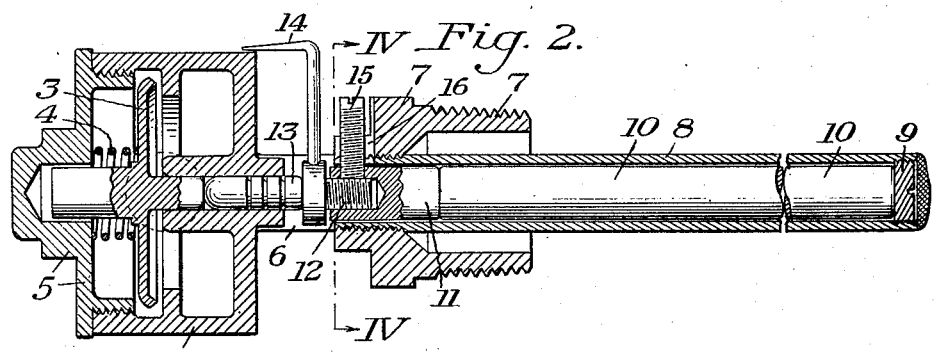
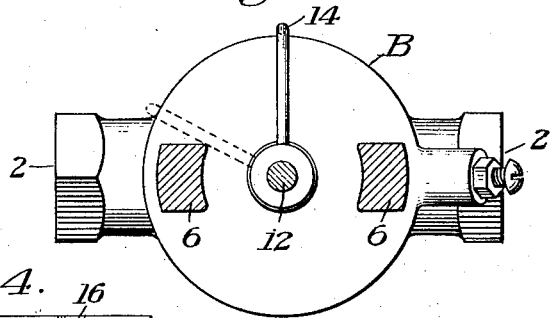
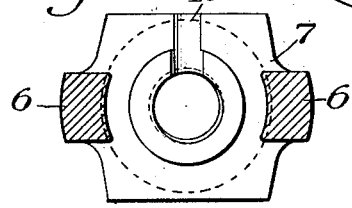

1,584,401

UNITED STATES PATENT OFFICE.

FREDERICK W. ROBERTSHAW, OF PITTSBURGH, PENNSYLVANIA, ASSIGNOR TO ROBERTSHAW THERMOSTAT COMPANY, OF YOUNGWOOD, PENNSYLVANIA, A CORPORATION OF PENNSYLVANIA.

THERMOSTAT.

REISSUED

Application filed October 30, 1923. Serial No. 671,694.

The present invention relates broadly to thermostats, and more particularly to thermostats of the type adapted for use in gas heated installations in which the supply of gas is controlled by the thermostat in accordance with variations in the temperature.

In thermostats of this character comprising relatively expansible and non-expansible elements, it is desirable to provide convenient means for setting the thermostats, whereby they may be caused to operate at any desired temperature. In accordance with the present invention, this is conveniently accomplished by providing intermediate the relatively expansible and non-expansible elements, which may be termed the heat responsive means, and the heat controlling means, which may be in the form of a gas valve, a pressure communicating means so constructed that its effective over-all length may be easily varied to correspondingly vary the effect of the heat responsive means on the heat controlling means.

Still another object of the present invention is to provide an improved thermostat construction whereby the assembly of the parts is facilitated, the length of the thermostat reduced, and the operation of the adjusting means simplified.

In the accompanying drawings, there is shown for purposes of illustration only, a preferred embodiment of the present invention, it being understood that the drawings do not define the limits of the invention, as changes in the construction and operation as disclosed therein may be made without departing from the spirit of the invention or scope of my broader claims.

In the drawings:

Figure 1 is a side elevation of a thermostat embodying the invention;

Figure 2 is a longitudinal sectional view on the line II—II of Figure 1 but with the indicator in upright position;

Figure 3 is a transverse sectional view on the line III—III of Figure 1, and

Figure 4 is a transverse sectional view on the line IV—IV of Figure 2 but showing only the thermostat body.

In the illustrated embodiment of the invention, there is provided a valve body B having inlet and outlet openings 2 and a controlling valve 3 for controlling the gas flow therebetween. The valve is preferably of the type normally urged in one direction by a spring 4 abutting at one end against the valve and at its opposite end against the inner surface of a removable cap 5, by means of which access to the interior of the valve, without disturbing the thermostat setting, is made possible.

Carried by the valve body and extending rearwardly therefrom is a supporting yoke, comprising spaced arms 6 carrying a threaded extension 7, by means of which the valve body is secured in operative position.

The heat responsive means may conveniently comprise an expansion tube 8 threaded at one end into the extension 7 and closed at its opposite end by a plug 9. Within this expansible tube there is provided a relatively non-expansible element 10 abutting at one end against the plug 9 and at its opposite end against the regulating screw plug 11. The regulating screw plug is preferably of such diameter that it may be slipped into position within the open end of the tube 8, and thereby facilitate assembly of the parts. The regulating screw plug is in turn adapted to transmit operating pressure to the valve 3 in opposition to the action of the spring 4 through the medium of a regulating screw 12 and a packing pin 13. The regulating screw has projecting therefrom an operating finger 14 shaped to cooperate with suitable graduations formed on the valve body.

From the foregoing it will be apparent that by moving the operating finger in the direction of the arrow designating "Cold" on the valve body, the regulating screw will be threaded into the regulating screw plug 11, thereby shortening the over-all length of the screw plug and screw. With the parts in this position, a relatively greater closing movement of the valve 3 under the influence of the spring 4 will take place than if the finger is moved in the opposite direction to thread the regulating screw out of the regulating screw plug. In this manner, it is possible to easily change the temperatures at which the heat responsive means becomes effective for producing a given movement of the valve. For holding the parts in their adjusted positions, there may be provided a regulating set screw 15 threaded transversely through the regulating screw plug and adapted to engage the regulating screw 12. This regulating set screw also holds the regulating screw plug against rotational movement in the tube 8 by passing through a slot 16 formed in a projecting boss on the extension 7 and in the tube 8.

Due to the fact that the regulating finger 14 is operable between the arms 6, it will be apparent that these arms serve as stops preventing the finger from being moved to such an extent that the original thermostat setting is lost. The packing pin 13, due to its loose bearing connection against the valve stem at one end and the regulating screw 12 at its other end, effectively transmits the desired operating pressures to the valve without any binding tendency.

The advantages of the present invention arise from the provision of improved means intermediate the heat responsive means and the heat controlling means for easily varying the effective temperature range of the thermostat.

Still further advantages arise from the provision of a construction in which the expansible tube is threaded into and through the extension 7 on the valve body, thereby providing a rigid mounting for the heat responsive means, a guide for the regulating screw plug, and a corresponding shortening of the over-all length of the thermostat.

I claim:

1. A thermostat, including a body having a slot therein, heat responsive means, heat controlling means regulable thereby, pressure communicating means between the heat responsive means and the heat controlling means, said pressure controlling means including a plug, a regulating screw threaded thereinto and adapted to be screwed into and out of the plug for varying the effective length of the pressure communicating means, and a set screw threaded in the plug for locking the regulating screw against movement relative to the plug, said set screw extending through said slot for preventing rotation of the plug, substantially as described.

2. A thermostat, including heat responsive means, heat controlling means regulable thereby, a body connecting the heat controlling means and the heat responsive means, and pressure communicating means between the heat controlling means and the heat responsive means including a screw for varying the effective length of the pressure communicating means and a finger for rotating the screw, said body forming a stop intermediate the heat responsive and heat controlling means for limiting such rotation, substantially as described.

3. A thermostat, including heat responsive means, heat controlling means regulable thereby, a body connecting the heat controlling means and the heat responsive means, and pressure communicating means between the heat controlling means and the heat responsive means including a screw for varying the effective length of the pressure communicating means and a finger intermediate the heat responsive and heat controlling means for rotating the screw, said body having spaced sides forming stops for said finger, substantially as described.

4. A thermostat having heat responsive means, heat controlling means regulable thereby, a slidable pressure communicating means between the heat responsive means and the heat controlling means freely abutting the heat controlling means and the heat responsive means, said pressure communicating means including means for varying the length thereof, said pressure communicating means having a positively limited range of adjustment, and an indicating scale cooperating therewith, substantially as described.

5. A thermostat having heat responsive means, heat controlling means regulable thereby, a sliding regulating plug between the heat responsive means and the heat controlling means, rotatable means for varying the effective length of the plug, means limiting the arc of rotation of said rotatable means, and a scale cooperating with said rotatable means, substantially as described.

6. A thermostat having heat responsive means, heat controlling means regulable thereby, pressure communicating means between the heat responsive means and the heat controlling means including a plug and a screw having a threaded connection therewith and adapted to be threaded into and out of the plug for varying the effective length of the pressure communicating means, said plug and screw having abutting engagement only with the parts between which it communicates pressure, and means for holding said plug and screw in adjusted position and preventing rotation of said plug while permitting sliding movement thereof, substantially as described.

7. A thermostat having heat responsive means, heat controlling means regulable thereby, pressure communicating means between the heat responsive means and the heat controlling means including a plug and a screw having a threaded connection therewith for varying the effective length of the pressure communicating means, and means adjustable at will for preventing movement of said screw with respect to said plug and for holding said plug against rotation, substantially as described.

8. In a thermostat, heat responsive means including a holder, controlling means regulable thereby, a body carrying said controlling means and to which the heat responsive means is secured, pressure communicating means between the controlling means and the heat responsive means, the pressure communicating means being guided by said holder, and a single means passing through said holder for preventing rotational movement of said pressure communicating means, substantially as described.

9. In a thermostat, a casing having an inlet and outlet opening, a valve adapted to control the flow between said openings, a projection on said casing, a thermostat carried by said projection, means intermediate the valve and thermostat and abutting against both the valve and the thermostat for transmitting pressure from the thermostat to the valve, means intermediate the casing and thermostat for varying the effective length of said pressure transmitting means, said projection limiting the operation of said last mentioned means substantially as described.

10. In a thermostat, a valve casing having an inlet and an outlet opening, a valve adapted to control the flow between said openings, a packing pin projecting rearwardly from said valve and separable therefrom, a projection on said casing, a thermostat carried by said casing and comprising an expansible tube and a relatively non-expansible member mounted therein, a plug abutting against said relatively non-expansible member and guided by said tube, means extending outwardly from said plug and through the projection for preventing rotation of the plug, and an adjusting screw cooperating with said plug and said packing pin, substantially as described.

In testimony whereof I have hereunto set my hand.

FREDERICK W. ROBERTSHAW.